June 2, 1970  D. G. SMITH  3,515,091

SHOCK INDICATOR FOR SHIPPING CONTAINER

Filed April 1, 1969

INVENTOR
Dresden G. Smith

BY

ATTORNEY

United States Patent Office 3,515,091
Patented June 2, 1970

---

3,515,091
SHOCK INDICATOR FOR SHIPPING CONTAINER
Dresden G. Smith, San Jose, Calif., assignor, by mesne assignments, to the United States of America as represented by the Secretary of the Navy
Filed Apr. 1, 1969, Ser. No. 811,934
Int. Cl. G01d 21/00
U.S. Cl. 116—114         7 Claims

ABSTRACT OF THE DISCLOSURE

A shock indicator for use with easily damaged apparatus having an ink-filled glass vessel and an absorbent blotting pad supported within a container with at least one transparent wall. Whenever the container is subjected to an excessive shock causing the vessel to be broken, the ink is absorbed by the blotter which forthwith takes on a distinctive color visible through the transparent wall to indicate that such a shock has been experienced.

BACKGROUND OF THE INVENTION

The present invention relates to environmental force indicators and more specifically to a shock indicating device.

During handling and shipping of delicate instruments and apparatuses damage may readily occur due to the inadvertent application of a shock or vibratory force. Such damage may not always be reflected in visible damage to the shipping container itself and it therefore has become common practice for the recipient of many types of delicate apparatus to open and throughly inspect the package before acceptance and/or use thereof. This is, however, a time consuming practice.

Various devices have heretofore been proposed for use with shipping containers for indicating vibration or shock such as, for example, recording accelerometers, but these devices are complex and relatively expensive. Moreover, it is still necessary in most cases to open the shipping carton to remove these devices in order to observe any environmental force recorded thereby.

SUMMARY OF THE INVENTION

Accordingly, it is an object of the present invention to provide a shock indicating device which can be attached to a shipping container and will instantly show, without dismantling of any kind, whether or not a damaging shock has occurred.

Another object of this invention is to provide a shock indicating device for use with shipping containers which is simple in construction and so inexpensive to produce as to be disposable when the container is discarded.

The foregoing and other objects are attained by a disposable device attachable to a shipping container and comprising a transparent enclosure for an ink-filled container and an absorbent device. A change of color of the absorbent device is clearly visible through the transparent wall of the enclosure and indicates that the container has been subjected to a shock of magnitude sufficient to break the glass container therein.

BRIEF DESCRIPTION OF THE DRAWING

Still other objects and many of the attendant advantages of this invention will be readily appreciated as the same becomes better understood by reference to the detailed description when considered in connection with the accompanying drawing wherein.

DESCRIPTION OF THE PREFERRED EMBODIMENT

Figure 1:
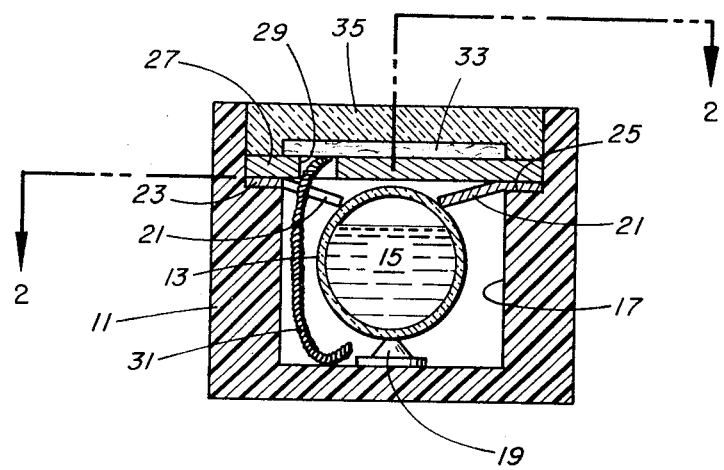
FIG. 1 is a side cross-sectional view of the shock indicator of the present invention.

Referring now in greater detail to FIG. 1 of the drawing, there is shown a cylindrical enclosure or box 11 constructed of acrylic plastic or another suitable inexpensive and rigid material which may be attached to a shipping carton in any appropriate manner. An exemplary method of attachment is to position the box 11 within a shipping carton with its top surface flush mounted with the outside upper surface of the carton, where it may be secured by a suitable adhesive.

A spherical glass vessel 13 filled with a bright-colored ink or dye 15 is supported within a cavity 17 formed in the box 11. Although glass has been found to be satisfactory for the purpose, the vessel 13 obviously may be constructed of any easily fractured frangible material that will normally contain the liquid ink or dye 15 therein.

The spherical vessel 13 is centrally disposed within the cavity 17 by a lower point support 19 and a plurality of upper supporting probes 21. As shown, the lower support 19 contacts the vessel on the vertical axis thereof, whereas the equally spaced points of contact of the upper probes 21 with the spherical surface of vessel 13 lie in a circle, the plane of which is normal to the vertical axis.

Figure 2:
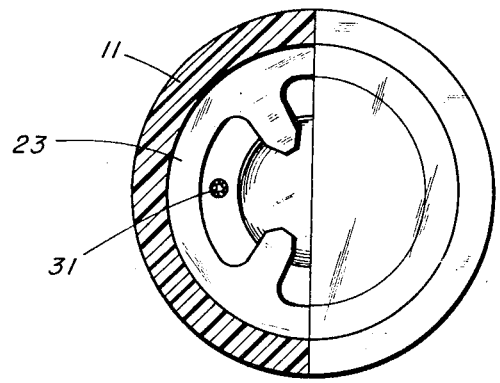
FIG. 2 is a top view of the device shown in FIG. 1, partially in section taken along the line 2—2.

The number and placement of the upper probes are dependent upon the requirements of a particular application, though at least three such probes, as shown in FIG. 2, are considered to be desirable in order to provide a stable mounting for the vessel. As illustrated, the upper probes 21 are formed as integral finger-like projections directed radially inward with a downward inclination from a ring 23, which may be of stamped metal sheet construction. The ring 23 is seated upon a shoulder 25 formed on the inner wall of the box 11 and is secured in place by a backup disc 27 placed thereon.

An aperture 29 formed in the disc 27 provides for passage therethrough of a wick 31 which is secured at one end thereof to the top surface of the disc and extends deep into the cavity 17 where it may be positioned beneath the vessel 13. A section of absorbent blotting paper 33, preferably white in color, is placed on the top surface of the disc 27 in contact with the wick 31 and is held in place by a transparent window 35, which may be constructed of a clear acrylic plastic. The window 35 may be secured to the enclosure or box 11 in any convenient manner.

The backup disc 27 therefore performs the function of mechanically securing the absorbent paper 33 in place in the overall structure and may be any shape according to the design of the box 11 and the cavity 17 therein.

Operatively, when attached to a shipping container in the manner hereinabove explained and subjected to an excessive shock or vibration force, the probes will puncture and shatter the thin glass vessel 13, dumping ink into the cavity 17. The ink 15 escaping from the vessel will be absorbed by the blotter paper 33 to change the color of the paper from white to a red or other similarly bright and easily discernible color. Even if the container and the shock indicating device attached thereto are kept upright before and after the shock occurs, the ink will still be transmitted from the bottom of the cavity 17 to the absorbent paper 33 through the wick 31. A quick view of the blotter paper through the transparent window 35 is all that is required, therefore, to determine whether or not a damaging shock has occurred.

From the foregoing description it will be seen that the shock indicating device of the present invention fully accomplishes the aims, objects and advantages sought thereby. Obviously, many modifications and variations of the invention are possible in the light of the above teach-

What is claimed is:
1. A shock indicator comprising:
a closed container having at least one transparent wall,
a frangible, ink-filled vessel,
means supporting said vessel in said container,
a section of absorbent paper positioned in said container adjacent said transparent wall and colorable by said ink, and
a flat plate disposed in said container between said transparent wall and said vessel with said absorbent paper sandwiched between the flat plate and said transparent wall, said plate having an aperture therein;
whereby said vessel is broken by said supporting means when a shock occurs, spilling said ink in said container to color said colorable absorbent paper and thereby provide an indication visible through said transparent wall that a shock has occurred.

2. A shock indicator according to claim 1 and further including wick means having one end disposed beneath said vessel and passing through said aperture in said plate to contact said absorbent paper at the other end thereof.

3. A shock indicator according to claim 2 wherein said support means for said vessel comprises a plurality of probes making point contact with said vessel for suspending said vessel in said container and being sensitive to shock for puncturing and thereby shattering said vessel.

4. A shock indicator according to claim 3 wherein a shoulder is provided on the inner wall of said container for supporting said flat plate, and said vessel supporting means comprises a metallic ring disposed between said plate and said shoulder, said probes being integral finger-projections of said ring.

5. A shock indicator according to claim 3 wherein said transparent wall is composed of a clear acrylic plastic material.

6. A shock indicator according to claim 5 wherein said absorbent paper is normally white in color.

7. A shock indicator according to claim 6 wherein said ink is a red ink.

References Cited

UNITED STATES PATENTS

| | | | |
|---|---|---|---|
| 2,674,221 | 4/1954 | Tinsley | 116—114 |
| 3,136,293 | 6/1964 | Schmitt | 116—114 |
| 3,177,843 | 4/1965 | Geocaris | 116—114.5 |
| 3,312,188 | 4/1967 | Lode et al. | 116—114 |
| 3,369,521 | 2/1968 | Meeder | 116—114 |
| 3,373,716 | 3/1968 | Williams | 116—114 |

LOUIS J. CAPOZI, Primary Examiner

U.S. Cl. X.R.

73—12